United States Patent
Schiffers et al.

(10) Patent No.: US 8,516,904 B2
(45) Date of Patent: Aug. 27, 2013

(54) TORQUE MEASUREMENT

(75) Inventors: Werner Schiffers, Ashby-de-la-Zouch (GB); John R. Webster, Derby (GB)

(73) Assignee: Rolls-Royce, PLC, London (GB)

( * ) Notice: Subject to any disclaimer, the term of this patent is extended or adjusted under 35 U.S.C. 154(b) by 64 days.

(21) Appl. No.: 13/128,458

(22) PCT Filed: Oct. 28, 2009

(86) PCT No.: PCT/EP2009/007709
§ 371 (c)(1),
(2), (4) Date: May 10, 2011

(87) PCT Pub. No.: WO2010/060517
PCT Pub. Date: Jun. 3, 2010

(65) Prior Publication Data
US 2011/0209563 A1  Sep. 1, 2011

(30) Foreign Application Priority Data

Nov. 26, 2008  (GB) .................................. 0821587.3

(51) Int. Cl.
*G01L 5/10* (2006.01)
*G01L 1/10* (2006.01)
*G01H 17/00* (2006.01)

(52) U.S. Cl.
USPC .......... 73/862.41; 73/862.59; 73/650; 73/660

(58) Field of Classification Search
USPC ................... 73/597, 599, 602, 627, 649, 655, 73/658, 862.41, 650, 660, 862.59
See application file for complete search history.

(56) References Cited

U.S. PATENT DOCUMENTS

| | | | | |
|---|---|---|---|---|
| 4,379,226 A * | 4/1983 | Sichling et al. | ............ | 250/231.1 |
| 4,481,825 A * | 11/1984 | Kljuev et al. | .................... | 73/655 |
| 4,977,784 A | 12/1990 | Eckerle | | |
| 5,559,358 A | 9/1996 | Burns et al. | | |
| 5,585,572 A * | 12/1996 | Kindler | .................... | 73/862.338 |
| 6,415,666 B1* | 7/2002 | Donskoy et al. | ................ | 73/627 |
| 6,492,933 B1* | 12/2002 | McEwan | ......................... | 342/28 |
| 6,505,130 B1* | 1/2003 | Springer et al. | ................ | 702/40 |
| 6,545,762 B2* | 4/2003 | Lewis et al. | ..................... | 356/502 |
| 7,073,384 B1* | 7/2006 | Donskoy et al. | ................ | 73/657 |
| 7,302,852 B2* | 12/2007 | Chien | ............................. | 73/643 |
| 2004/0017299 A1* | 1/2004 | Campbell et al. | ........ | 340/870.01 |
| 2009/0320609 A1* | 12/2009 | Xia et al. | .................... | 73/862.08 |
| 2010/0319457 A1* | 12/2010 | Tyren | ............................. | 73/649 |

FOREIGN PATENT DOCUMENTS

| | | |
|---|---|---|
| GB | 1066312 | 4/1967 |
| WO | WO 01/73389 A1 | 10/2001 |

OTHER PUBLICATIONS

International Search Report for International Patent Application No. PCT/EP2009/007709, mailed on May 7, 2010.
Written Opinion for International Patent Application No. PCT/EP2009/007709, mailed on May 7, 2010.
Search Report for priority British Patent Application No. 0821587.3, dated Dec. 23, 2008.

* cited by examiner

*Primary Examiner* — Lisa Caputo
*Assistant Examiner* — Jonathan Dunlap
(74) *Attorney, Agent, or Firm* — Oliff & Berridge, PLC

(57) ABSTRACT

A strain sensor apparatus for a rotatable shaft including a radiation emitter/receiver, a vibration element attached to the shaft and a reflector that is positioned to reflect radiation onto the vibration element.

11 Claims, 3 Drawing Sheets

(a)    (b)

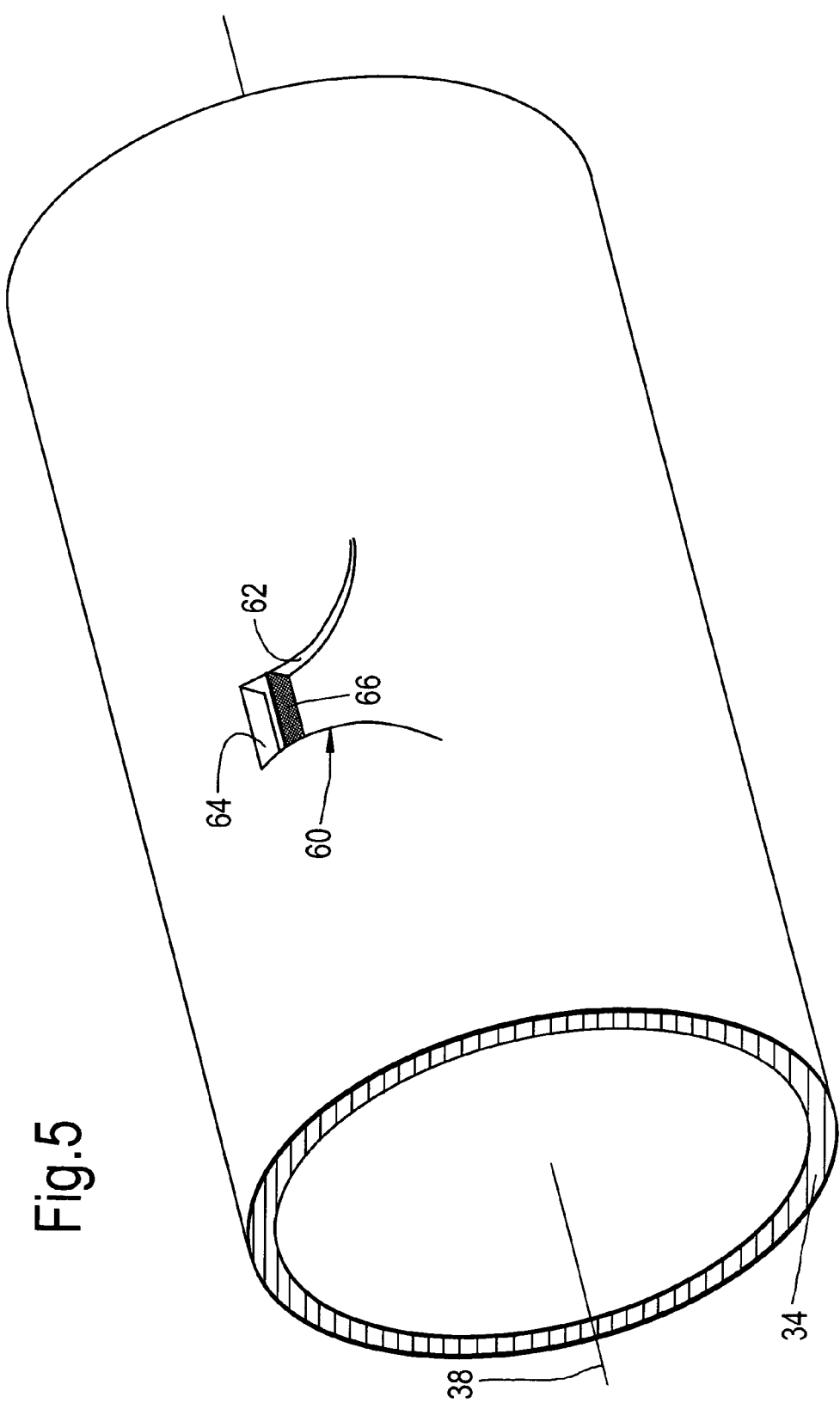

TORQUE MEASUREMENT

BACKGROUND

The present invention relates to a method and apparatus associated with wireless flexural behaviour measurement and in particular, but not exclusively, steady and/or vibrational torque measurement of a shaft of a gas turbine engine for example.

Conventional wireless sensors find a wide range of applications in the area of instrumentation for example in engine development work, processing plants and medicine. Wireless sensors have shown potential for vibration and rotation monitoring. When applied for instrumentation on development gas turbine engines, wireless sensors have a number of advantages such as the reduction of expensive wiring, the reduction of complexity, reduced set up time for monitoring and removal of connector faults.

One application of wireless sensors is the measurement of torque on a rotating shaft. The majority of torque sensors employ strain gauges and use slip rings, inductive or optical links to transfer data.

One such torque sensor apparatus 30 is shown on FIG. 1 and comprises an emitter/transceiver 32 directed to a shaft 34 having a metal wire 36 attached thereto. The metal wire is attached between two points on the shaft at an angle to its rotational axis 38. If no torque is applied common in-service vibrations in the shaft excite the string and make it vibrate at its resonant frequency $f_0$, determined by string's geometrical and material parameters. Application of a torque to the shaft alters the string tension, resulting in a corresponding change of the resonance frequency. The microwave transceiver 32, directed towards the sensing wire 44, emits a radio-frequency (RF) signal which is reflected by the wire 44. The amplitude of the return signal 54 is modulated due to the string's vibrations. The change of amplitude between successive, once-per-revolution readings is indicative of the torque applied to the shaft 34.

SUMMARY

However, this prior art arrangement is disadvantaged because the wire vibrates in three dimensions; producing omni-directional wave scattering that reduces the signal strength back to the transceiver.

Therefore it is an object of the present invention to provide new torque sensor apparatus and method of measuring torque which obviates the above mentioned problems.

In accordance with the present invention there is provided a strain sensor apparatus for a rotatable shaft comprising a radiation emitter/receiver, a vibration element attached to the shaft and a reflector that is positioned to reflect radiation onto the vibration element.

Preferably, the reflector is concave and positioned to reflect radiation onto a part of the vibrational element having the greatest amplitude.

Alternatively, the reflector comprises walls that channel radiation onto the vibrational element.

Preferably, the reflectors are positioned to reflect radiation from the vibrating element back to the radiation emitter/receiver.

Preferably, a radiation-reflective annulus surrounds the shaft and vibration element.

Preferably, a waveguide extends between the emitter/transceiver and an aperture defined in the annulus.

Alternatively, two vibration elements are positioned to reflect radiation from one to the other.

Preferably, the two vibration elements are spaced apart and angled at approximately 90 degrees to one another.

Preferably, the vibration element is a wire.

Alternatively, the vibration element is a plate.

BRIEF DESCRIPTION OF THE DRAWINGS

The present invention will be more fully described by way of example with reference to the accompanying drawings in which:

FIG. 5 is schematic axial view of further embodiment of a torque sensor apparatus applied to a shaft in accordance with the present invention.

DETAILED DESCRIPTION

Figure 1:
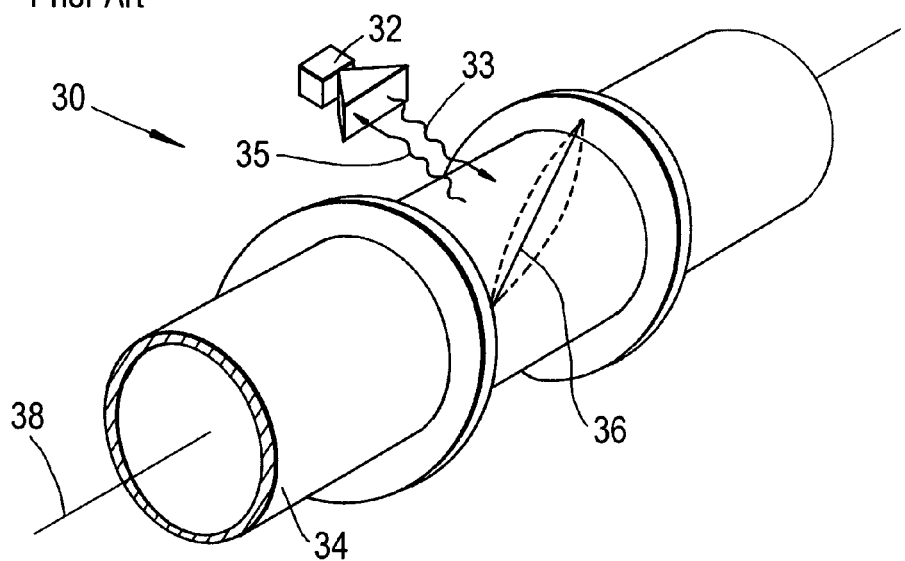
FIG. 1 is a schematic view of a prior art torque sensor apparatus applied to a shaft.
Figure 2:
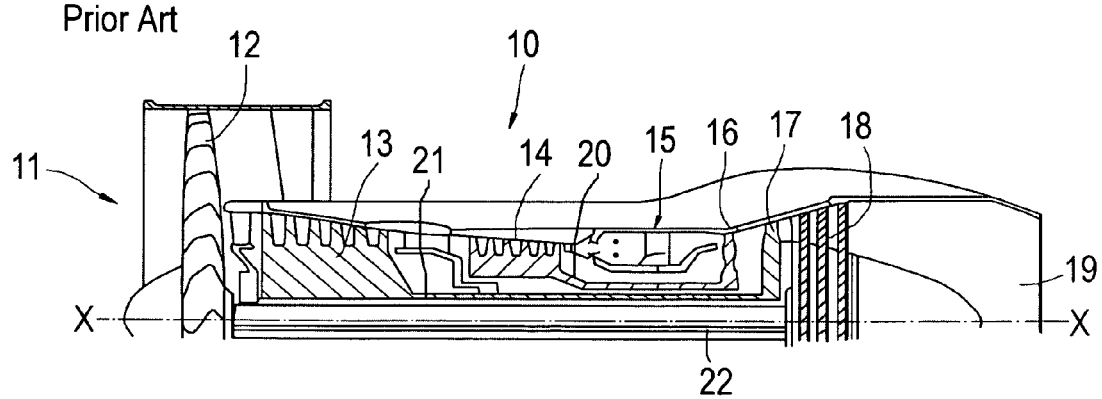
FIG. 2 is a schematic section of a prior art three-shaft ducted fan gas turbine engine.

With reference to FIG. 2, a ducted fan gas turbine engine generally indicated at 10 has a principal and rotational axis X-X. The engine 10 comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19.

The gas turbine engine 10 works in a conventional manner so that air entering the intake 11 is accelerated by the fan 12 to produce two air flows: a first air flow into the intermediate pressure compressor 14 and a second air flow which passes through a bypass duct (not shown) to provide propulsive thrust. The intermediate pressure compressor 13 compresses the air flow directed into it before delivering that air to the high pressure compressor 14 where further compression takes place. The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by interconnecting shafts 20, 21, 22 respectively thereby making up high, intermediate and low-pressure spools.

Figure 3:
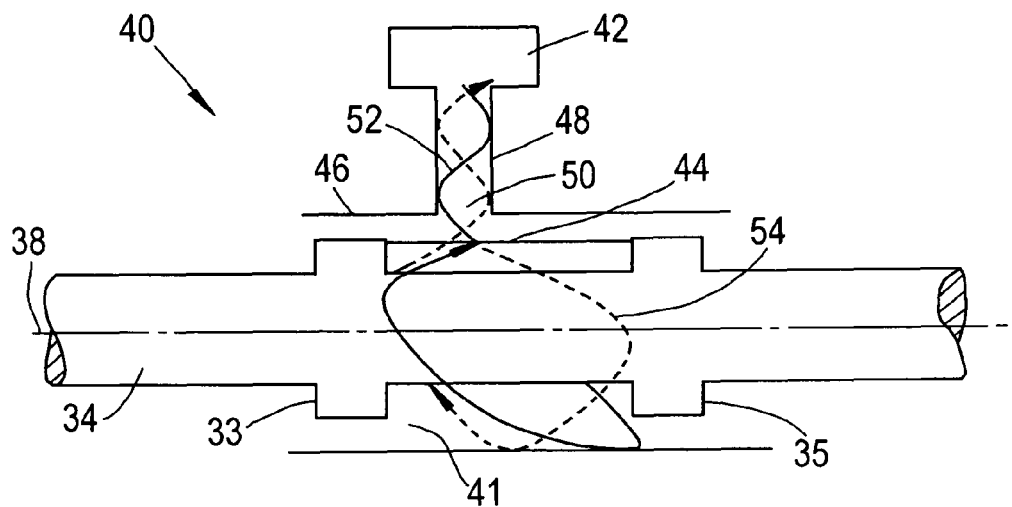
FIG. 3 is a schematic side view of torque sensor apparatus applied to a shaft in accordance with the present invention.

Referring to FIG. 3, a novel torque sensor apparatus comprises an emitter/transceiver 42 directed to a vibration element 44, in this example a metal wire, attached to a shaft 34, for example between two flanges 33, 35. A radiation-reflective annulus 46 surrounds the shaft radially outwardly of the vibration element 44. A waveguide 48, itself radiation-reflective, extends between the emitter/transceiver 42 and an aperture 50 defined in the annulus 46.

The emitter/transceiver 42 emits microwave radiation (solid line 52), which is channelled through the waveguide 48, through the aperture 50 and into the generally annular space 41 between the shaft 34 and annulus 46. Both the shaft 34 and importantly the annulus 46 are substantially impermeable to (microwave) radiation, such that their surfaces reflect the radiation. The microwave radiation output 52 is then guided between the rotating shaft 34 and the annulus 46 and impinges on the vibrational wire 44. The radiation reflected by the vibrational element, or return signal, is shown as a dashed line 54. Thus, while the shaft 34 is rotating, the vibrating element 44 will be able to 'see' the microwave radiation constantly rather than at a once-per-revolution interval of the prior art arrangement. This novel torque sensor apparatus 40, therefore results in a higher average signal level being detected, which in turn is capable of giving a much improved quantity and quality data.

A further advantage of the invention is the continuous visibility of the signal, rather than a once-per-revolution 'snapshot' which enables detection of behavioural defects such as flutter. In other words vibrational characteristics that occur within a single revolution of the shaft are not capable of being detected by the prior art arrangement and indeed its results may be affected by unexplainable or not-apparent phenomena. As will be described later this is not the case with the arrangement of the present invention.

Figure 4:
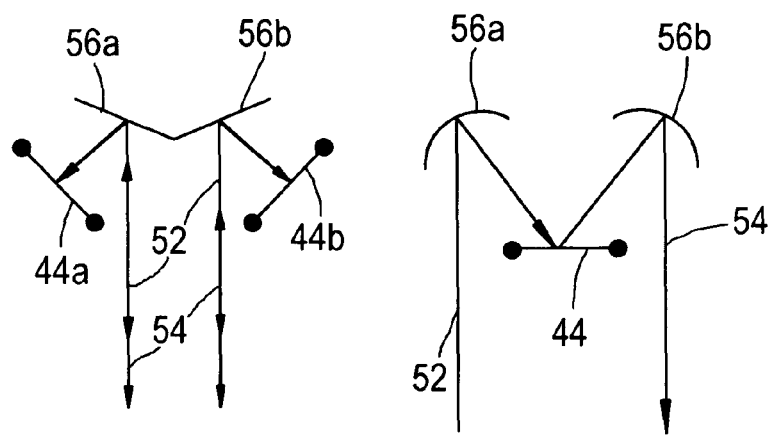
FIGS 4a-4b are a schematic layout of embodiments of torque sensor apparatus in accordance with the present invention.

In FIG. 4a, the torque sensor apparatus 40 comprises two reflectors 56a, 56b at approximately 135° to one another with the vibration elements 44a, 44b opposite the reflectors at 45° to shaft axis in order to achieve optimum signal conditions. Note that the incoming and returning radiation paths 52, 54 are along the same lines. FIG. 4b is an improvement because the radiation is reflected off reflector 56a or 56b respectively onto string 44a or 44b respectively. The energy loss after reflection will be less compared to the previous configuration as the reflectors are rigid.

In FIG. 4b, two reflectors 56a, 56b are arranged at approximately 90° and are adjacent a single vibration element 44. One reflector 56a directs the microwaves towards the vibration element and the other reflector 56b directs the reflected signal from the vibration element back to the detector 42. This again is to achieve a stronger signal at the detector because the reflector 56a is capable of focusing emitted radiation 52 onto the vibration element. The third improvement is described in FIG. 4b where a parabolic reflector will concentrate the radiation onto the centre of a string and the reflections will be directed back to the receiver. The parabolic reflector enables maximum radiation transfer. The above description is fine for string geometries, however will provide an even greater effect to the proposed plate 60 of FIG. 5. In particular configuration of FIG. 4b with parabolic reflectors will be able to direct the radiation onto the centre point of the plate.

In the embodiment described with reference to FIG. 4b, the reflectors may be either planar in shape or may be concave shape. In particular, the concave shape enables the radiation to be focussed onto the centre of the vibration element 44 where its amplitude is greatest and therefore its reflection response is further improved.

FIG. 5 shows a further embodiment of the present invention wherein a groove 60 is formed in the shaft 34 and comprises side walls 62 and an end wall 64. A vibrating element 66, here in the form of a plate, is located groove and is spaced apart from the end wall 64. The side walls 62 converge towards the plate 66 and channel or focus the incoming radiation towards the vibrating element 66. The vibrating element may be a wire. In both cases the end wall 64 is a reflector and reflects the radiation from the vibrating element 66 back to the transceiver 42.

Various combinations of the embodiments may be used by the skilled artisan for any particular application and all are intended to be within the scope of the present invention. For example, the vibration plate 60 may be substituted in place of any of the vibration wires 44a, 44b in FIGS. 4a and 4b. More than one pair of vibration elements and more than one pair of reflectors may be used.

Although microwave radiation is a preferred wavelength other forms of radiation may be used. Typically the annulus is made from suitable material to reflect the radiation. Similarly, the vibration elements 44, 66 may be made from similar materials.

The invention claimed is:

1. A strain sensor apparatus for a rotatable shaft, the strain sensor apparatus comprising:
   a radiation emitter/receiver;
   a vibration element attached to the shaft; and
   a reflector, wherein
      the reflector is positioned on the shaft opposite the vibration element to reflect radiation emitted by the emitter/receiver onto the vibration element.

2. A strain sensor apparatus as claimed in claim 1 wherein the reflector is concave and positioned to reflect radiation onto a part of the vibrational element having the greatest amplitude.

3. A strain sensor apparatus as claimed in claim 1, the strain sensor apparatus further comprising:
   walls that channel radiation onto the vibrational element.

4. A strain sensor apparatus as claimed in claim 1 wherein the reflector is positioned to reflect radiation from the vibrating element back to the radiation emitter/receiver.

5. A strain sensor apparatus as claimed in claim 1 wherein a radiation-reflective annulus surrounds the shaft and vibration element.

6. A strain sensor apparatus as claimed in claim 5 wherein a waveguide extends between the emitter/receiver and an aperture defined in the annulus.

7. A strain sensor apparatus as claimed in claim 1 wherein two vibration elements are positioned to reflect radiation from one to the other.

8. A strain sensor apparatus as claimed in claim 7 wherein the two vibration elements are spaced apart and angled at approximately 90 degrees to one another.

9. A strain sensor apparatus as claimed in claim 1 wherein the vibration element is a wire.

10. A strain sensor apparatus as claimed in claim 1 wherein the vibration element is a plate.

11. A strain sensor apparatus as claimed in claim 1, wherein the reflector focuses radiation onto the vibration element.

\* \* \* \* \*